(12) United States Patent
Conner et al.

(10) Patent No.: US 9,117,367 B2
(45) Date of Patent: Aug. 25, 2015

(54) SYSTEMS AND METHODS FOR IMPROVING RUNWAY STATUS AWARENESS

(75) Inventors: Kevin J Conner, Kent, WA (US); Courtney Ashford, Morristown, NJ (US); Steve C. Johnson, North Bend, WA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 316 days.

(21) Appl. No.: 13/604,523

(22) Filed: Sep. 5, 2012

(65) Prior Publication Data
US 2014/0062729 A1    Mar. 6, 2014

(51) Int. Cl.
| G08G 5/00 | (2006.01) |
| G08G 5/06 | (2006.01) |
| G01C 23/00 | (2006.01) |
| G02B 27/01 | (2006.01) |
| B64F 1/00 | (2006.01) |
| B64D 45/00 | (2006.01) |
| B64F 1/18 | (2006.01) |
| G08G 5/02 | (2006.01) |

(52) U.S. Cl.
CPC ............ *G08G 5/0021* (2013.01); *B64F 1/002* (2013.01); *B64F 1/18* (2013.01); *G08G 5/025* (2013.01); *G08G 5/065* (2013.01); *B64D 2045/0055* (2013.01)

(58) Field of Classification Search
USPC .......... 340/972, 973, 953, 574, 971; 701/120, 701/10, 3, 14, 200, 455, 26, 457; 342/26 B, 342/29, 33, 36, 34, 64
See application file for complete search history.

(56) References Cited

U.S. PATENT DOCUMENTS

| 4,435,694 A | * | 3/1984 | Riebold ...................... 340/953 |
| 6,304,800 B1 | | 10/2001 | Ishihara et al. |
| 8,145,367 B2 | | 3/2012 | Khatwa et al. |
| 8,200,378 B1 | | 6/2012 | Chiew et al. |
| 2002/0104472 A1 | * | 8/2002 | Neubert ...................... 116/209 |
| 2003/0033084 A1 | * | 2/2003 | Corcoran, III ............... 701/301 |
| 2008/0109160 A1 | | 5/2008 | Sacle et al. |
| 2008/0140727 A1 | * | 6/2008 | Pschierer ..................... 707/200 |
| 2011/0090096 A1 | * | 4/2011 | Goh et al. .................... 340/972 |
| 2011/0184635 A1 | * | 7/2011 | Khatwa et al. ............... 701/120 |
| 2014/0062729 A1 | * | 3/2014 | Conner et al. ................ 340/972 |

FOREIGN PATENT DOCUMENTS

| EP | 2317488 A2 | 5/2011 |
| FR | 2954543 | 6/2011 |

OTHER PUBLICATIONS

EP Communication, EP 13182085.4-1803 dated Apr. 14, 2014.
(Continued)

Primary Examiner — Fekadeselassie Girma
(74) Attorney, Agent, or Firm — Ingrassia Fisher & Lorenz, P.C.

(57) ABSTRACT

An apparatus, method and computer program product for generating and annunciating to a flight crew if they are on or approaching a closed runway. The present invention alerts the pilot to operations on closed runways with appropriate and non-misleading information, thus allowing the pilot to make better decisions.

8 Claims, 4 Drawing Sheets

(56) References Cited

OTHER PUBLICATIONS

Vernaleken, C. et al.; Considerations on symbology, data requirements and operational concept for integral NOTAM visualization on airport moving map displays; Proc. of SPIE vol. 6957 6957OM-1; 2008 SPIE Digital Library.
EP Search Report, EP 13182085.4-1803/2720214 dated Jan. 4, 2014.

* cited by examiner

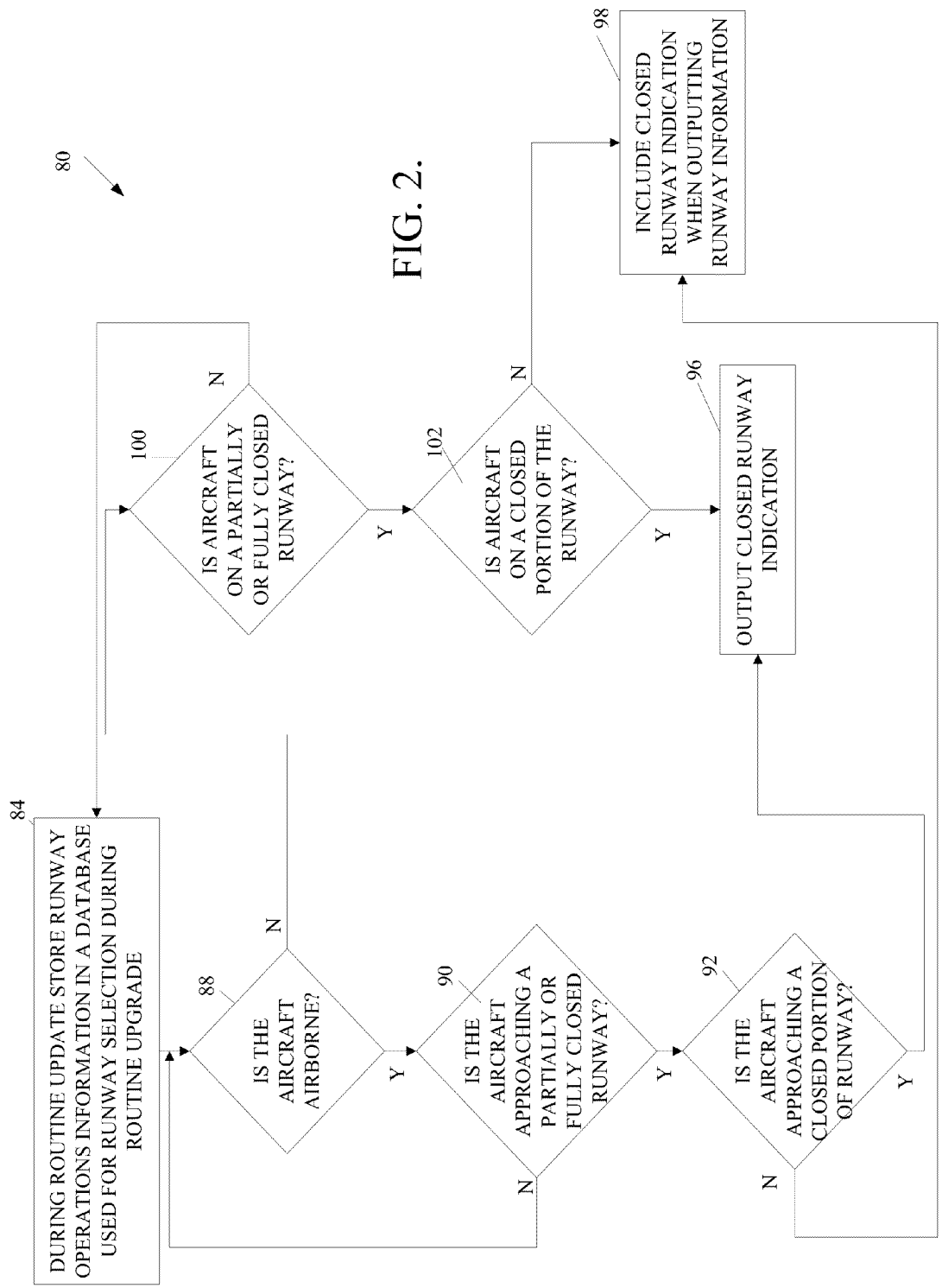

SYSTEMS AND METHODS FOR IMPROVING RUNWAY STATUS AWARENESS

BACKGROUND OF THE INVENTION

Honeywell's SmartRunway® addresses one of the National Transportation Safety Board's (NTSB) top 10 global safety concerns—runway incursions. With one incident happening daily worldwide, runway incursions cost the industry about $100 million USD a year for passenger injuries and aircraft repairs and inspections.

As a next-generation solution to the Runway Alert and Advisory System (RAAS), SmartRunway™ improves situational awareness by providing timely positional advisories and graphical alerts to crew members during taxi, takeoff, final approach, landing, and rollout, to reduce the likelihood of a runway incursion.

When an aircraft approaches a closed runway for landing or takeoff, the information provided to the pilot may be misleading.

SUMMARY OF THE INVENTION

The present invention provides an apparatus, method, and computer program product for generating and annunciating to a flight crew if they are on or approaching a closed runway. The present invention alerts the pilot to operations on closed runways with appropriate and non-misleading information, thus allowing the pilot to make better decisions.

Instead of just an "Approaching three four left" or "Approaching Taxiway", the present invention provides a more appropriate "Approaching CLOSED runway three four left," thus giving the pilot the data needed to respond appropriately. Similarly for takeoff, the previous alert is "On Taxiway." According the present invention, that alert becomes "On Closed Runway," removing confusion and allowing the pilot to provide a more timely response.

BRIEF DESCRIPTION OF THE DRAWINGS

Preferred and alternative embodiments of the present invention are described in detail below with reference to the following drawings.

DETAILED DESCRIPTION OF THE INVENTION

In one embodiment, the present invention provides improvements to the SmartRunway™ by Honeywell, Inc., which offers improved situational awareness for the flight crew in order to help lower the probability of runway incursion incidents and accidents by providing timely aural messages to the flight crew during ground taxi, takeoff, final approach, and landing/roll-out operations.

Alerts are generated, based upon the aircraft's current position when compared to airport runway information stored within a runway database (e.g., Honeywell's Enhanced Ground Proximity Warning System (EGPWS) database).

The present invention is described more fully hereinafter with reference to the accompanying drawings, in which preferred embodiments of the invention are shown. This invention is, however, embodied in many different equivalent forms and is not to be construed as limited to the embodiments set forth herein; rather, these embodiments are provided so that this disclosure will be thorough and complete, and will fully convey the scope of the invention to those skilled in the art. Like numbers refer to like elements throughout.

The present invention is an apparatus, method, and computer program product for generating and annunciating to the crew an aircraft advisory with respect to a position of the aircraft relative to airport runways, by selecting a runway and determining a position and orientation of the aircraft relative to the runways, both on the ground during takeoff and landing, and providing a pilot with situational awareness of the airport runways.

In one embodiment, the present invention provides outputs that are heard or seen by the crew in normal operations over output devices, such as speakers 28 or display 30, providing increased position awareness relative to the runway during taxi and flight operations. The present invention includes a runway database that includes operational status (i.e., closed) runway information for allowing detection of operations on closed runways and alerting of the pilot to the closed status of runways. The closed runway information may identify a runway as being partially or fully closed. If the closed runway information identifies a runway as being partially closed, the runway information may include information about the area of the runway that is closed (or the portion that is open). The present invention is interoperable with Honeywell's SmartRunway® for avoiding multiple, confusing annunciations.

Figure 1:
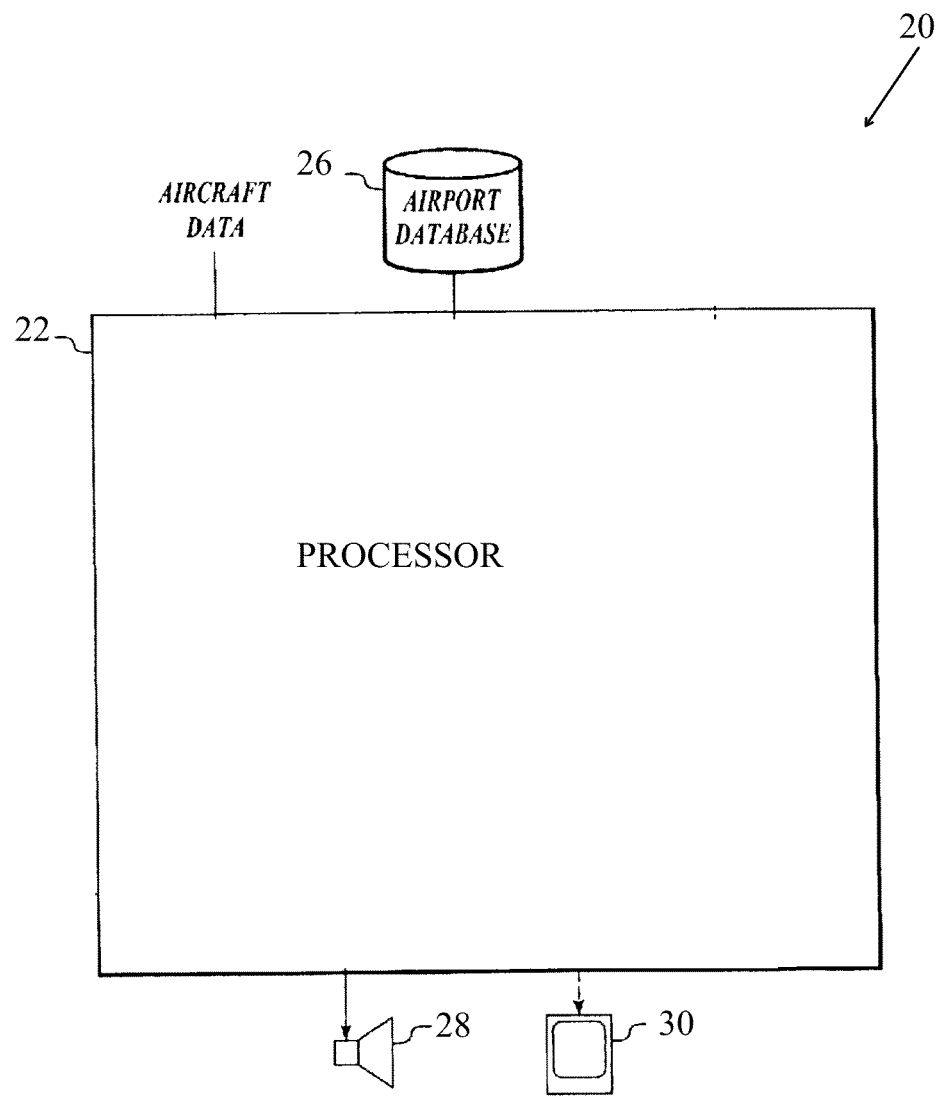
FIG. 1 is a block diagram of an exemplary system formed in accordance with an embodiment of the present invention.

FIG. 1 illustrates by example and without limitation an airport situational awareness system 20 for locating an aircraft with respect to airport taxiways and runways and generating advisories for enhancing a pilot's situational awareness.

The airport situational awareness system 20 includes a processor 22 that is coupled to periodically sample real-time electronic data signals representative of one or more aircraft state parameters of interest, such as latitude and longitude position information; radio, GPS, or barometric altitude; ground speed; track angle; gear setting; horizontal and vertical figures of merit; and one or more other aircraft state parameters, as may be of interest. Such data are available in different formats, including ARINC 429, ARINC 575, analog, discrete, or an advanced digital format.

The navigation data may be obtained directly from the navigation system, which may include an inertial navigation system (INS), a satellite navigation receiver such as a global position system (GPS) receiver, VLF/OMEGA, Loran C, or VOR/DME, or from a Flight Management System (FMS).

The airport database 26 may includes airport information, such as data on fixed obstacles (tower, buildings, and hangars), runways of interest, including: airport designator for identifying airport; width and length values; runway survey data, including runway center point, runway centerline and both runway endpoints; runway position quality information providing a gross estimate in nautical miles of position uncertainty of runway and quality factor information providing fine estimate, for example in feet, of position uncertainty of runway; runway elevation; runway true heading in degrees for the end of runway, and runway designator angle based on assigned designation; glideslope angle in degrees for an approach on either heading, i.e., to either end of the runway; transition altitude in feet at the runway location; runway closure information; terrain quality data within a selected area surrounding the runway, such as an area of about 15 miles, including highest and lowest elevations; and a survey accuracy factor. Much of the stored information is for use by Runway Selection Logic executed by the processor 22.

The runway selection performed by the processor 22 is described in U.S. Pat. No. 6,304,800, entitled Automated Runway Selection, issued to Yasuo Ishihara, et al. on Oct. 16, 2001, which is owned by the assignee of the present application, and the entirety of which is incorporated herein by reference.

However, in relation to the description of the various embodiments of the present invention provided in detail below, it must be understood that aspects of the present invention can be used with any system that uses stored information concerning runways for runway selection. As this disclosure is for illustrative purposes only, the scope of the present invention should not be limited to the systems described below, as the concepts and designs described below may be implemented in any type of system that uses runway information for runway selection.

The database could be merged into an existing database as long as backward compatibility is maintained. In one embodiment, a bit is added to each runway entry in the database. The bit, when activated, marks a runway as being closed. In this embodiment, when adding the bit, the corresponding runway is marked as non-RAAS (runway awareness and advisory system) (i.e., not available for selection in the RAAS). In another embodiment, the processor 22 includes code that will include Closed non-RAAS runways as potential runways, but will attach the closed information to any selected runway output information.

The information output is intended to reduce the risk of a closed runway incursion. By alerting the pilot to operations on closed runways, with appropriate and non-misleading information, the pilot can make better decisions. So instead of just an "Approaching three four left" or "Approaching Taxiway" alert, the more appropriate alert "Approaching CLOSED runway three four left" will give the pilot the data needed to respond appropriately. Similarly for takeoff, the potentially misleading "On Taxiway" alert will become "On Closed Runway", removing confusion and allowing the pilot to respond more quickly.

Figures 1, 3:
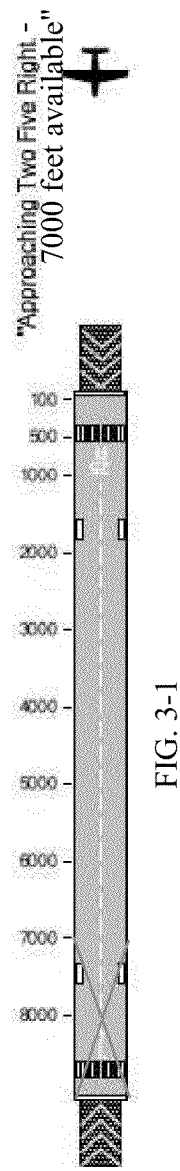
FIGS. 3 and 4 show situations where the improvement provided by the present invention is provided.
Figures 2, 3:
FIG. 2 is a flowchart of an exemplary process performed by the system shown in FIG. 1.

FIG. 2 shows an exemplary process 80 performed by the system 20. First, at a block 84, routine updates of the runway operations information (including closed-runway information) are applied to the runway database. Most airlines require a periodic update to the runway database. The frequency of this update provides adequate closed-runway information for the flight crew. Next, at a decision block 88, the processor 22 determines if the aircraft is airborne. If the aircraft is not airborne, then, at a decision block 90, the processor 22 determines if the aircraft is approaching a partially or fully closed runway. If the airborne aircraft is not approaching a partially or fully closed runway, then the process 80 returns to decision block 88. If the airborne aircraft is approaching a partially or fully closed runway, then, at a decision block 92, the processor 22 determines if the aircraft is approaching a closed portion of a partially closed runway or approaching a closed runway. If the aircraft is approaching a closed portion of a partially closed runway or is approaching a closed runway, then, at a block 96, the processor 22 outputs to the output device(s) a closed-runway indication (i.e., audio or visual). If the aircraft is not approaching a closed portion of a partially closed runway, then, at a block 98, the processor 22 outputs to the output device(s) an inclusion of a closed-runway information (e.g., amount of available runway) with runway id information.

If at decision block 88, the processor 22 determines that the aircraft is not airborne, then, at a decision block 100, the processor 22 determines whether the aircraft is on a partially or fully closed runway. If the aircraft is not on a partially or fully closed runway, then the process 80 returns to block 84 or decision block 88. If the aircraft is on a partially or fully closed runway, then, at a decision block 102, the processor 22 determines if the aircraft is on a closed portion of a partially closed runway or on a closed runway. If the aircraft is on a closed portion of a partially closed runway or on a closed runway, then, at a block 96, the processor 22 outputs to the output device(s) a closed-runway indication (i.e., audio or visual). If the aircraft is not on a closed portion of a partially closed runway, then, at a block 98, the processor 22 outputs to the output device(s) an inclusion of a closed-runway information (e.g., amount of runway available) with runway id information.

Closed-runway indication is, for example, "On Closed Runway" or "Approaching Closed Runway," depending on airborne state.

FIG. 3-1 shows a situation where an aircraft is approaching an open end (portion) of a partially closed runway, the runway is treated as being shorter. Once the aircraft is within a threshold envelope from the runway, the alert "Approaching Two Five Right—7000 feet available" is outputted to the flight crew based on the stored runway database information.

In another embodiment, the processor 22 may indicated how much of the runway is closed if the aircraft is approaching a closed section. For example, an "Approaching 25R, first 1000 feet Closed" is provided if the first 1,000 feet of runway are closed.

FIG. 3-2 shows a situation where an aircraft is on a closed end (portion) of a partially closed runway or a fully closed runway. The alert "On Closed Runway" is outputted to the flight crew based on the stored runway database information, when the aircraft is determined to be on the runway.

If the aircraft in on an open section of a partially closed runway, the example alerts "On Runway Two Four, 7000 feet available" or "On Runway Two Four, last 1000 feet is closed" are provided.

When taking off or landing on the open section of a partially closed runway, then only the shorter runway is analyzed for available runway length. Takeoff from a closed section should not happen.

Figure 4:
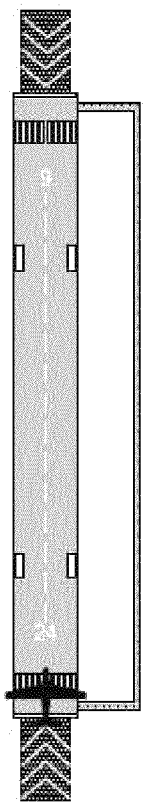

FIG. 4 shows situations where an aircraft is on a closed runway. If the aircraft is on the closed end (portion) of a partially closed runway or on a fully closed runway, then an "On Closed Runway" alert is outputted to the flight crew based on the stored runway database information. If the aircraft is on an open end (portion) of a partially closed runway, the alert "On Two Four Right—_____ feet available" is outputted to the flight crew based on the stored runway database information.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a processor,
      automatically selecting a runway based on a direction of travel of an aircraft in the air or based on a position of the aircraft on the ground;

determining if the automatically selected runway is identified as at least a partially closed runway, based on previously uploaded runway operational information stored in a database;

if it is determined that the automatically selected runway is not at least a partially closed runway, then repeating said step of determining if the automatically selected runway is identified as at least a partially closed runway without the generation or presentation of a closed runway indication;

if, in the alternative, it is determined that the automatically selected runway is at least a partially closed runway, then:

determining whether the aircraft is approaching the selected runway from the air or on the selected runway on the ground;

if it is determined that the aircraft is approaching the selected runway from the air, then generating a closed-runway indication that comprises either an approaching closed runway alert in the event that the selected runway is a fully-closed runway or a runway length available alert in the event that the selected runway is a partially-closed runway;

if, in the alternative, it is determined that the aircraft is on the selected runway on the ground then generating a closed-runway indication that comprises either an on closed runway alert in the event that the selected runway is a fully-closed runway or a runway length available alert in the event that the selected runway is a partially-closed runway; and at an output device, presenting the generated closed-runway indication.

2. The method of claim 1, further comprising:
at the processor,
periodically updating the database with current runway operational information.

3. The method of claim 1, wherein the runway operational information comprises closure information.

4. The method of claim 3, wherein the closure information comprises at least one of partial or full closure information and wherein the partial closure information identifies the area of the partial runway closure.

5. A system located on an aircraft, the system comprising:
a database configured to store previously uploaded runway operational information;
a processor configured to,
automatically select a runway based on a direction of travel of an aircraft in the air or based on a position of the aircraft on the ground;
determine if the automatically selected runway is identified as at least a partially closed runway, based on the stored runway operational information;
if it is determined that the automatically selected runway is not at least a partially closed runway, then repeating said step of determining if the automatically selected runway is identified as at least a partially closed runway without the generation or presentation of a closed runway indication;
if, in the alternative, it is determined that the automatically selected runway is at least a partially closed runway, then:
determine whether the aircraft is approaching the selected runway from the air or on the selected runway on the ground;
if it is determined that the aircraft is approaching the selected runway from the air, then generate a closed-runway indication that comprises either an approaching closed runway alert in the event that the selected runway is a fully-closed runway or a runway length available alert in the event that the selected runway is a partially-closed runway;
if, in the alternative, it is determined that the aircraft is on the selected runway on the ground then generate a closed-runway indication that comprises either an on closed runway alert in the event that the selected runway is a fully-closed runway or a runway length available alert in the event that the selected runway is a partially-closed runway; and
an output device configured to present the generated closed-runway indication.

6. The system of claim 5, further comprising a communication device configured to receive updated runway operational information from a remote source, wherein the processor is configured to update the database with received runway operational information.

7. The system of claim 5, wherein the runway operational information comprises closure information, and wherein the closure information comprises at least one of partial or full closure information.

8. A method for improving runway status awareness, the method being performed automatically by a computer processor embedded within electronic flight systems of an aircraft, the method comprising:
determining automatically, using the electronic flight systems of the aircraft, whether the aircraft is airborne or not airborne;
if it is determined that the aircraft is airborne, then:
a) automatically determining, based on an automatically-detected movement of the aircraft through the air, whether the aircraft is approaching a runway that is either partially-closed or fully-closed, and based on the automatically determining of step a), subsequently performing one of steps a-i), a-ii), or a-iii), as follows;
i) if the aircraft is approaching an open portion of a partially-closed runway, generating and presenting a runway closed indication that comprises a runway landing length available alert;
ii) if the aircraft is approaching a closed portion of a partially-closed runway or a fully-closed runway, generating and presenting a runway closed indication that comprises an approaching closed runway alert;
iii) if the aircraft is not approaching a runway that is either partially-closed or fully-closed, then repeating the automatically determining step a) without generating or presenting a closed runway indication;
if, in the alternative, it is determined that the aircraft is not airborne, then:
b) automatically determining, based on an automatically-detected position of the aircraft on the ground, whether the aircraft is positioned on a runway that is either partially-closed or fully-closed, and based on the automatically determining of step b), subsequently performing one of steps b-i), b-ii), or b-iii), as follows;
i) if the aircraft is located on an open portion of a partially-closed runway, generating and presenting a runway closed indication that comprises a runway take-off length available alert;
ii) if the aircraft is located on a closed portion of a partially-closed runway or a fully-closed runway, generating and presenting a runway closed indication that comprises an on closed runway alert;

iii) if the aircraft is not positioned on a runway that is either partially-closed or fully closed, then repeating step b) without generating or presenting a closed runway indication.

\* \* \* \* \*